Feb. 1, 1927.
W. G. WILSON
LIFTING VALVE
Filed Jan. 6, 1926
1,616,420
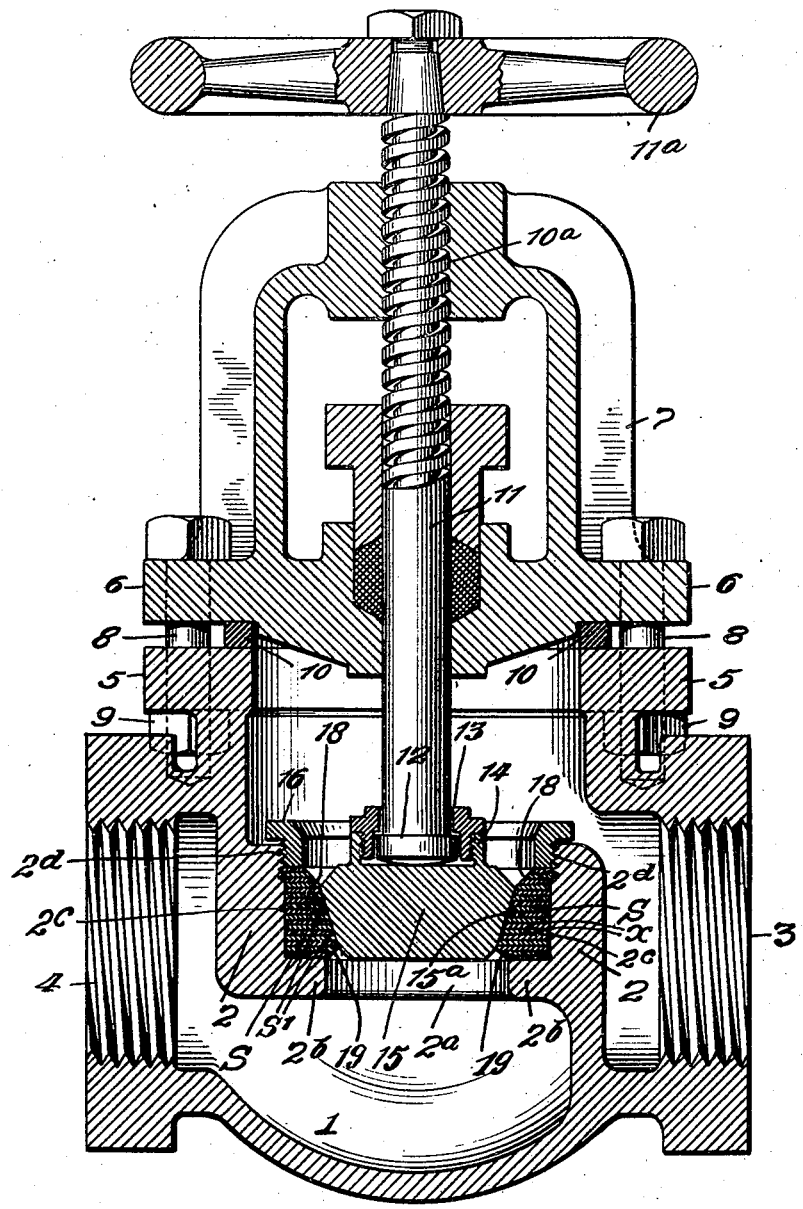
INVENTOR
Wylie Grummel Wilson
BY Edward T Beach
ATTORNEY Patented Feb. 1, 1927.

1,616,420

UNITED STATES PATENT OFFICE.

WYLIE GEMMEL WILSON, OF ELIZABETH, NEW JERSEY.

LIFTING VALVE.

Application filed January 6, 1926. Serial No. 79,570.

This invention relates to improvements in valves. Its object is to produce a non-sticking valve having a fluid-tight, port joint in which one of the complementary sealing or joint forming surfaces is a tapered cylindrical port wall of hard, dense and but slightly elastic material and in which the other sealing surface is the wall of a tapered cylindrical port.

In the drawing forming a part hereof and illustrating the invention, the figure is a vertical central section of a so-called valve embodying the invention.

In the drawings, the under casing member 1 has a diaphragm 2 between the intake and discharge chambers of the valve casing. The diaphragm is annularly recessed on its upper face; its bottom is formed with a port $2^a$ of lesser diameter than the diameter of the recess so as to form a ledge $2^b$ around the port. The recess is indicated by $2^c$. The upper end of the interior wall of the recess is threaded at $2^d$.

Casing member 1 also has a port 3 and a port 4, one or the other of which forms a discharge port. Casing member 1 has a flange 5 bolted to a flange 6 of the bonnet 7 by bolts 8 and nuts 9. A gasket 10 is interposed between the flanges and the bonnet is provided with the usual interior means for carrying a threaded valve stem 11 which at $10^a$ is in threaded engagement with a threaded hole through the bonnet top and has a handle $11^a$ for use in reciprocating the spindle to seat and unseat the reciprocable sealing member or plug. The under end of the stem is provided with a flanged enlargement 12 which is held in an inverted, cupped nut 13 through the upper wall of which the stem passes freely, the nut being threaded into the upstanding annular threaded flange 14 of a metallic, tapered cylindrical sealing plug 15.

The sealing member S complementary to the reciprocable sealing surface $15^a$ of the metal plug 15 is made up of successive, flatwise superposed, strongly compacted and united layers of asbestos or the like forming a sealing member S of stiff and but slightly elastic character. It is preferably made up of asbestos packing rings or the like. It is of annular form and has between its under and upper ends an upwardly tapered sealing surface S' corresponding to the sealing surface $15^a$ of the tapered plug. Sealing member S is mounted snugly in the recess $2^c$ with its under end supported on the ledge $2^b$. It is firmly clamped in the recess against the ledge $2^b$ by an annular collar 16 which is threaded into engagement with threads at $2^d$ in the wall of the recess.

The upper, peripheral corner of the plug 15 is bevelled off to prevent it from seating on the upper, interior, circumferential, bevelled corner 18 of the complementary sealing member S, the under, interior peripheral corner 19 of which is also bevelled. The sealing surface S' projects beyond the bevelled surfaces at 18 and 19.

In the present case, the under end of the sealing member S is solidly supported on the rigid ledge $2^b$ and it is clamped down into the recess $2^c$ by the threaded annulus 16 so that the upper end of the sealing member S is rigidly supported by the upper wall of the threaded annulus. The laminæ X of the sealing member S are in a dense, precompacted, united condition. While this sealing member is compressible, it is only very slightly compressible; and as a consequence it substantially retains its form under pressure. Being hard and dense, it does not yield in such wise that it can be substantially deformed. When the plug 15 is either seated or moved away from its seat, the edges of the disks, layers, or laminæ in the member S are subject to friction to a greater or less extent and this friction, especially in a seating movement, involves the wiping of the edges of the laminæ in the sealing surface $15^a$ with a tendency to tear or disrupt them and consequently these edges require the rigid support afforded them by the ledge $2^b$ and the under end wall of the annulus 16, because the material is too weak of itself to stand the pull and pressure on the edges and it is necessary that they do not project unduly beyond their supports. That is, inwardly beyond the opposed walls of the ledge $2^b$ and annulus 16. The extreme under and upper end portions of the sealing member S where they are bevelled, do not function for sealing, but do function to support each the other in a bevelled portion and also to support the intermediate laminæ the edges of which constitute the sealing surface. The bevelled laminæ at the ends of the member S also serve to space the sealing surface forming laminæ away from the rigid ledge $2^b$ and under wall of annulus 16 and these walls also give rigid support to all the laminæ in the member. The walls and the laminæ thus support each other and insure untorn and unfrayed sealing edges of the laminæ forming the member S. And it is an object of this invention so to support the edges of the laminæ which constitute the sealing edges that they will not be frayed or torn under conditions of use. If fraying or tearing is started in the edge of a lamina in the sealing surface, it is apt to be extended to one or more other layers in the sealing surface and effect leakage.

What I claim is:

1. In a valve the combination with a reciprocable, solid valve plug of a stationary, apertured, sealing member of compacted and united laminæ of dense and but slightly elastic material, the aperture having a conical, downwardly tapered sealing surface composed of the edges of layers of laminæ and having at each end of its sealing surface an interior bevelled, peripheral corner portion the laminæ in which serve as supports for each other and for all the laminæ between rigid flat walls; and means for supporting and clamping said member in place, such means comprising rigid end walls and the interiorly bevelled laminæ at each end of the apertured sealing member serving to space the sealing surface apart from an adjacent rigid wall.

2. In a valve, the combination with a reciprocable, solid valve plug of a stationary, apertured, sealing member of compacted and united laminæ of dense and but slightly elastic material, the aperture having a conical, downwardly tapered sealing surface composed of the edges of layers of laminæ and having at each end of its sealing surface an interior bevelled, peripheral corner portion the laminæ in which serve as supports for each other and for all the laminæ between rigid flat walls; and means for supporting and clamping said member in place, such means comprising rigid end walls and the interiorly bevelled laminæ at each end of the apertured sealing member serving to space the sealing surface apart from an adjacent rigid wall; and means for supporting and clamping said sealing member in place.

3. In a valve, the combination with a reciprocable, solid valve plug of a stationary, apertured, sealing member of compacted and united laminæ of dense and but slightly elastic material, the aperture having a conical, downwardly tapered sealing surface composed of the edges of layers of laminæ and having at each end of its sealing surface an interior bevelled, peripheral corner portion the laminæ in which serve as supports for each other and for all the laminæ between rigid flat walls; and means for supporting and clamping said member in place, such means comprising rigid end walls and the interiorly bevelled laminæ at each end of the apertured sealing member serving to space the sealing surface apart from an adjacent rigid wall; said conical, downwardly tapered sealing surface projecting inwardly of the interior, outwardly bevelled peripheral corners; and means for supporting and clamping said sealing member in place, said sealing surface projecting towards the axis of the sealing member, beyond the supporting and clamping means.

Signed at New York in the county of New York and State of New York this 23th day of December, A. D. 1925.

WYLIE GEMMEL WILSON.